UNITED STATES PATENT OFFICE.

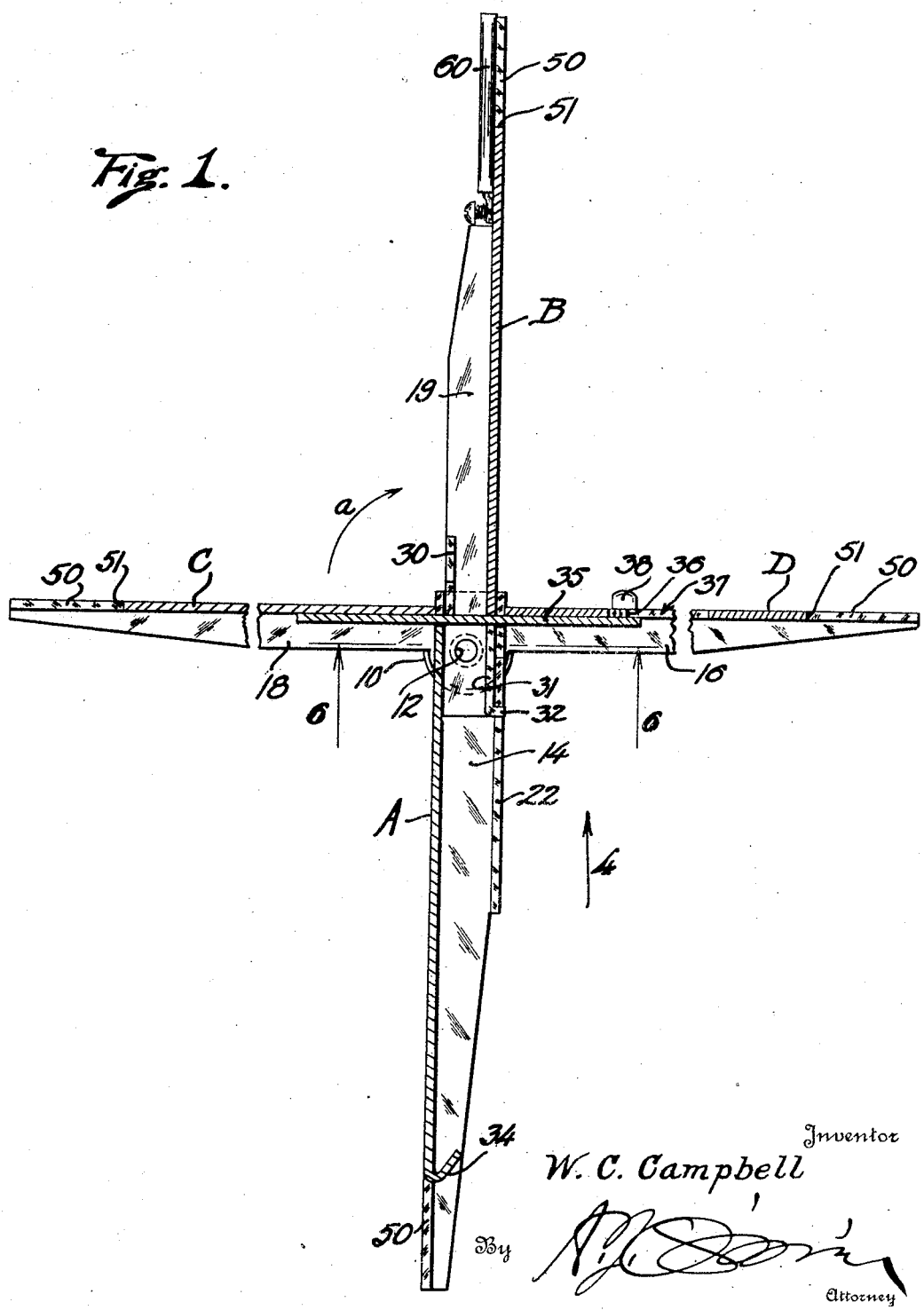

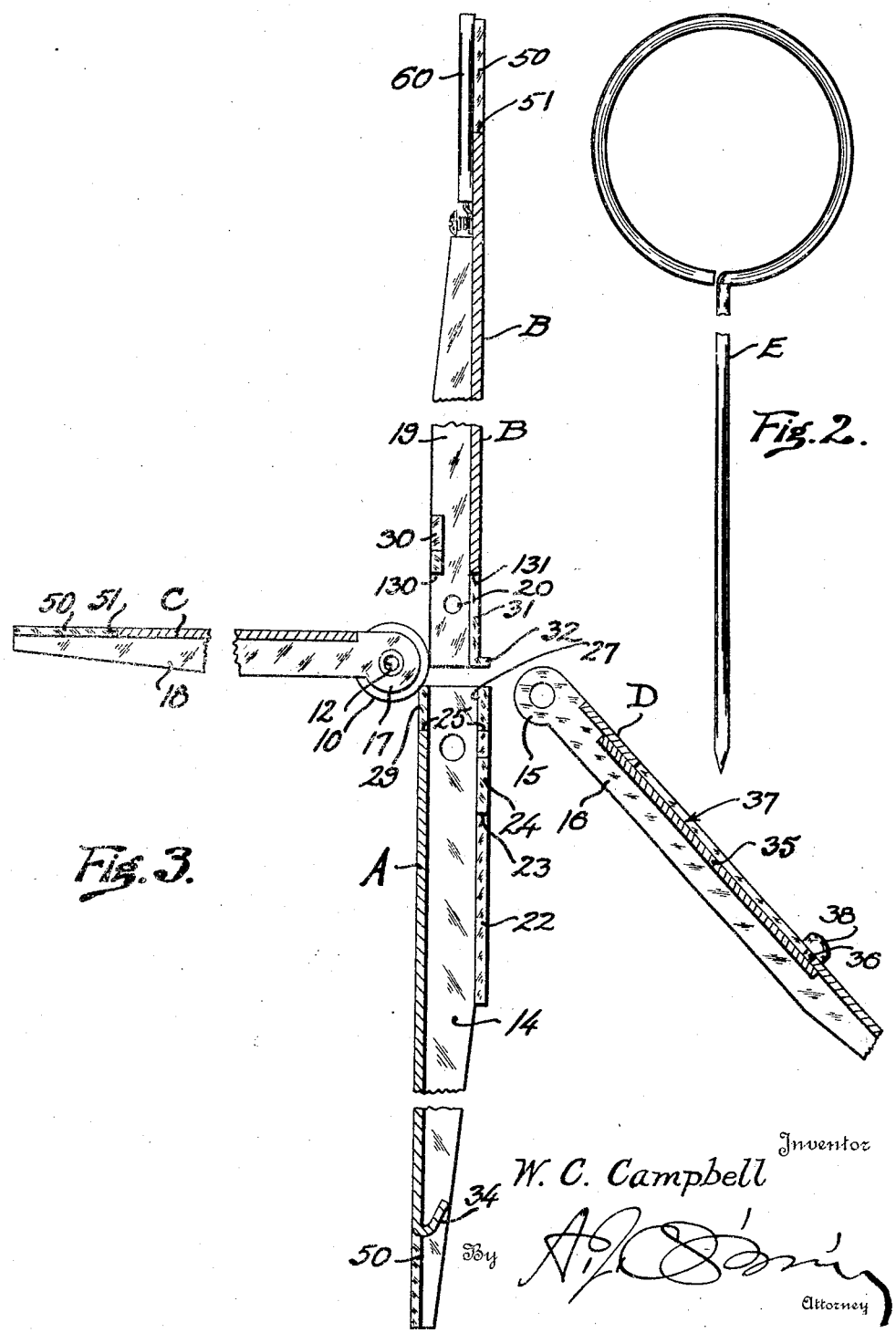

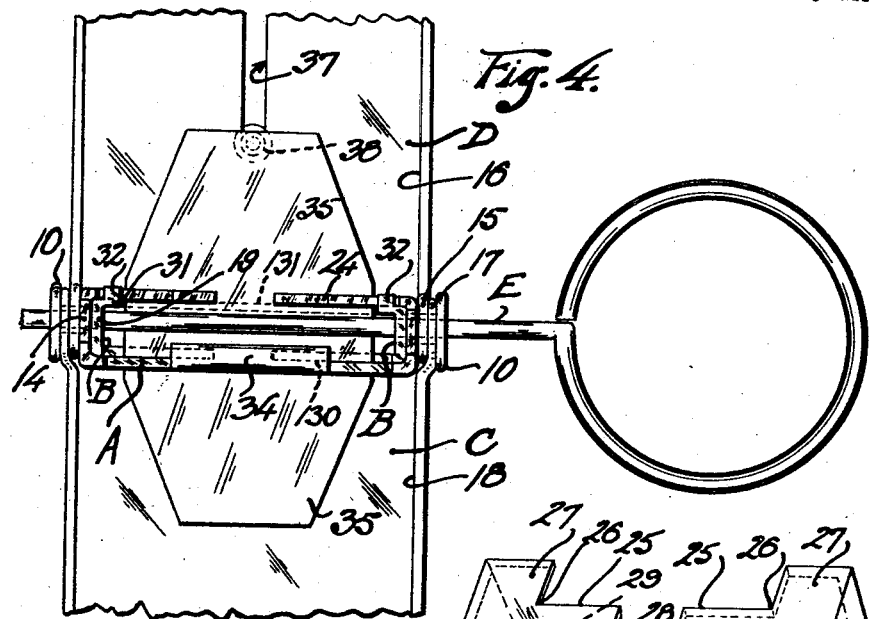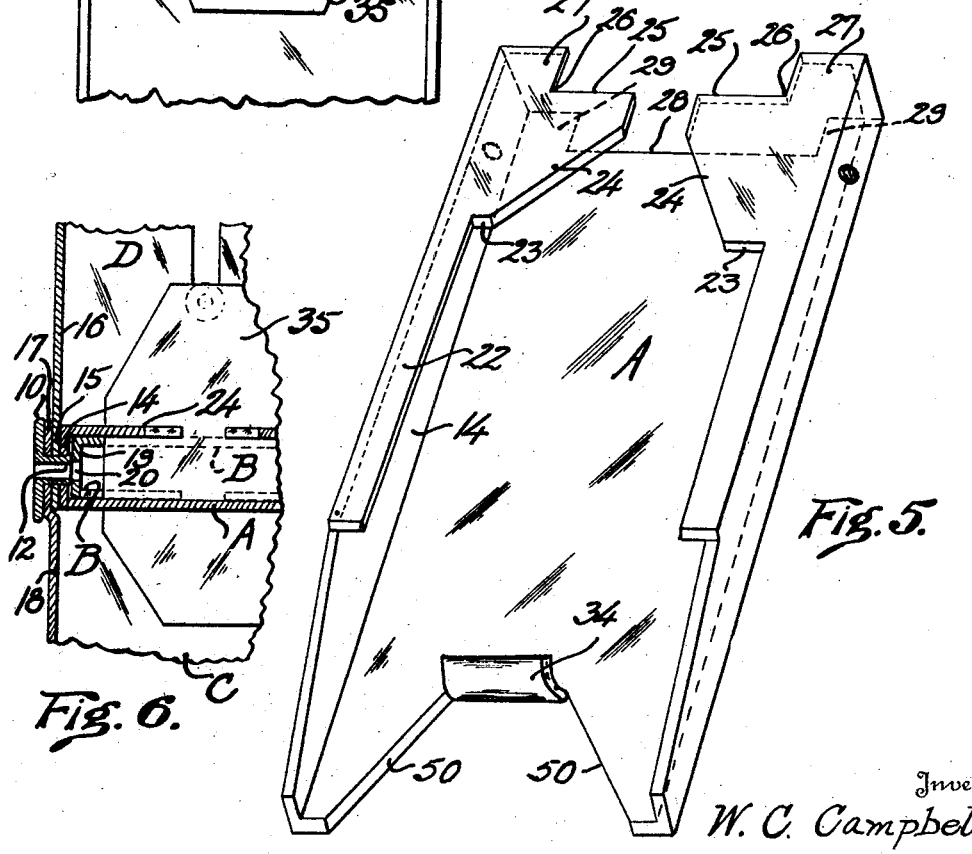

WILLIAM CHESTER CAMPBELL, OF DENVER, COLORADO, ASSIGNOR OF ONE-HALF TO AUSTIN P. RUSSELL, OF CHEYENNE, WYOMING.

TAPE REEL.

1,412,449.  Specification of Letters Patent.  Patented Apr. 11, 1922.

Application filed June 1, 1920. Serial No. 385,603.

*To all whom it may concern:*

Be it known that I, WILLIAM CHESTER CAMPBELL, a citizen of the United States, residing at the city and county of Denver and State of Colorado, have invented certain new and useful Improvements in Tape Reels; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a tape reel, especially for the use of surveyors, which may be readily opened and firmly retained in said open position for use, and readily folded into small space when not in use.

Briefly, the invention comprises a main leaf having guides for slidably receiving another leaf which is adapted to be projected therefrom in longitudinal alignment therewith. Said main leaf has pivoted to the outer sides thereof a pair of oppositely disposed leaves adapted to stand at right angles to said main leaf when in operative position, and to fold against said main leaf when not in use. One of said pair of oppositely disposed leaves carries a sliding plate which is adapted to be slid through openings in the other two leaves and engage shoulders on said other two leaves to permit movement of said sliding leaf and also to engage the back of the other of said oppositely disposed leaves, for the purpose of holding the entire structure rigidly in open position. The pivots on the opposite sides of the device are hollow and are adapted to receive a long spindle or chaining pin which may be thrust into the ground so that the reel may be allowed to rest upon the ground when being unwound, and by means of which the reel may be held in the hand while winding.

In the drawings:

Fig. 1 is a vertical section through the reel.

Fig. 2 indicates the chaining pin on which the reel is mounted for winding and unwinding.

Fig. 3 shows the leaves in disassembled relation.

Fig. 4 is a fragmentary elevation indicated by the arrow 4 of Fig. 1.

Fig. 5 is a perspective of the main leaf; and

Fig. 6 is a fragmentary section taken through the hinge on line 6—6 of Fig. 1.

The main leaf A slidably receives a second leaf B and has pivoted to the opposite sides thereof a pair of oppositely disposed leaves C and D. The pivoting means on each side is composed of a hollow pivoting sleeve 10, having an outer flange and whose inner end 12 is expanded into the adjacent side wall 14 of the main leaf A. The leaf D has apertured ears 15 on its side walls 16 journalled upon said pivoting sleeves 10, and the leaf C has apertured ears 17 of its side walls 18 also journalled upon said sleeves 10.

The side walls 19 of the sliding leaf B are apertured at 20 in alignment with the hollow pivoting sleeves 10, but do not receive said sleeves 10.

The main leaf A has its side walls 14 equipped with overhanging flanges 22, parallel with the back or body of the leaf. Said flanges 22 extend inwardly to shoulders 23, whence said flanges extend at an angle towards each other to produce a pair of oppposed ears 24, which terminate short of the end of the leaf, to provide transverse shoulders 25 which extend laterally outward to points 26 and thence to the inner end of the leaf to provide smaller ears 27. The back or main plate of said leaf A is cut out to form a transverse rearwardly-directed face 28, slightly rearward of the pivoting apertures, this face terminating short of the sides of the leaf to provide small ears 29 directly under the ears 27 and of the same size. The rear face 28 and the rear faces or shoulders 25 of the ears 24 are in direct vertical alignment.

The side walls 19 of the sliding leaf B are provided slightly forward of the pivoting points with a pair of oppositely arranged ears 30, like the ears 24 of the leaf A, these ears presenting rearwardly or inwardly directed faces 130. The back or main plate of said sliding leaf B is cut transversely to provide an inwardly directed face 131, at whose ends oppositely disposed ears 31 are arranged, these ears thus being at the sides of the leaf. The ears 31 are spaced from each other the same distance as are the ears 27 and 29. The innermost ends of the ears 31 are provided with upstanding lugs 32, which are adapted to engage the shoulders 23 of the main leaf A when said leaves are in operative position, as indicated in Fig. 1, thereby limiting the opening movement of the leaf B in the leaf A. The outer end of the main plate of the leaf A is provided with a hook 34, which will engage the rear faces or shoulders 130 of the ears 30 on leaf B to prevent the leaf B from sliding out of leaf A when the device is being closed after use.

The inner faces 130 of the ears 30, and the inner face 131 of the main plate of sliding leaf B, are in alignment with the inner walls of the main plates of the leaves C and D when the leaves are in operative relation, that is, when the lugs 32 engage the shoulders 23 of leaf A. In this position the inner wall 28 of the leaf A, and the shoulders 25 of the ears 24, which are in alignment with one another, are in position forward of said walls of the leaves C and D a distance equal to the thickness of the plate 35, slidable upon said inner walls of said leaves C and D, slidably mounted in the leaf D by means of a pin 36 secured in said plate 35 and projecting through a slot 37 in the leaf D, and retained by means of a button 38 on the outer end of said pin 36.

In order to wind tape upon the reel, the ends of the leaves are provided with angular faces 50 and transverse faces 51 at the inner ends of said faces 50 on the leaves B, C and D. These faces 51 provide bearing points for the tape, while the curved face of the hook 34 on leaf A provides a corresponding bearing face. In order to wind tape on the reel, a handle 60, pivoted to the far side of the leaf B, may be swung out at right angles to the leaf for turning the same upon the spindle E, which may be used as a bearing shaft.

To close the reel, the thumb of one hand is placed upon the button 38, and the fingers passed around and brought into engagement with the plate 35. By drawing the plate outwardly (Fig. 3), it will then be removed from engagement with the various faces 25, 28, 130, 131, and from engagement with the inner walls of the main plates of leaves C and D. This permits the sliding leaf B to be moved inwardly into the main leaf A. The leaves C and D are then swung on the pivots 10 towards each other so as to engage upon opposite sides of the main leaf A. This gives a folded device which is of the same length as the leaf A, and of substantially the same width and thickness. It may then readily be slipped into one's pocket or into a carrying case.

In unwinding the reel, the spindle E will be passed through the hollow pivoted sleeves 10 from right to left of Fig. 4, as indicated, and the point thrust into the ground. Draft upon the tape will cause the reel to unwind in the direction of the arrow a of Fig. 1, the side walls or flanges 14, 18 and 19 of the leaves A, C and B, respectively, trailing along upon the ground, thus causing the rounded engaging edges at the junction between said side walls and the main plates of the respective leaves to constitute the advancing edges. Since the forward edge of the side wall or flange 16 of leaf B is the only edge which precedes its main plate, the minimum of dirt will be plowed up as the tape is unwound.

The spindle or chaining pin E is also used as a means for holding the reel when winding tape upon it.

I claim:

1. A reel comprising a plurality of movably connected leaves, means permitting said leaves to be folded together, said means comprising a sliding connection between two of said leaves and a pivotal connection between one of said slidably connected leaves and the remaining leaves.

2. A folding reel comprising a main leaf, a second leaf slidable upon said main leaf, a plurality of pivotally connected leaves pivotally mounted upon the main leaf, and means for retaining the second leaf extended from the main leaf and for retaining said pivoted leaves spread with relation to the others.

3. A folding reel comprising a main leaf, a second leaf slidable upon said main leaf, a plurality of leaves pivotally mounted upon the main leaf, one of said plurality of leaves having a plate slidably mounted thereon and adapted to pass between said main leaf and said slidable leaf when said leaves are in operative relation and to engage another of said plurality of leaves.

4. A folding reel comprising a main leaf, a second leaf slidable therein, a pair of leaves pivoted to said main leaf and adapted to be swung into position on opposite sides of the main leaf and perpendicular thereto, and a plate slidably mounted on one of said pair and adapted to pass between said main leaf and in said slidable leaf and into engagement with the other of said pair to maintain the leaves rigidly in spread relation.

5. A folding reel comprising a plurality of rectangular leaves having a substantially channel shaped cross section, a main leaf, a second leaf slidably connected with said main leaf, a pair of hingedly connected leaves pivotally connected to said main leaf and foldable against the sides of the same whereby the reel may be folded into a space slightly larger than the main leaf and means for retaining said leaves in fixed spread relation.

In testimony whereof I affix my signature.

WILLIAM CHESTER CAMPBELL.